United States Patent
Tamura et al.

(10) Patent No.: US 10,461,599 B2
(45) Date of Patent: Oct. 29, 2019

(54) BREATHER STRUCTURE OF IN-WHEEL MOTOR DRIVE UNIT AND IN-WHEEL MOTOR DRIVE UNIT INCLUDING THE SAME

(71) Applicants: NTN CORPORATION, Osaka (JP); Shiro Tamura, Shizuoka (JP); Takanori Ishikawa, Shizuoka (JP); Shinya Taikou, Shizuoka (JP)

(72) Inventors: Shiro Tamura, Shizuoka (JP); Takanori Ishikawa, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 221 days.

(21) Appl. No.: 15/503,750

(22) PCT Filed: Aug. 10, 2015

(86) PCT No.: PCT/JP2015/072610
§ 371 (c)(1),
(2) Date: Feb. 14, 2017

(87) PCT Pub. No.: WO2016/027710
PCT Pub. Date: Feb. 25, 2016

(65) Prior Publication Data
US 2017/0288490 A1 Oct. 5, 2017

(30) Foreign Application Priority Data
Aug. 20, 2014 (JP) .................................. 2014-167879

(51) Int. Cl.
*F16H 57/027* (2012.01)
*H02K 5/04* (2006.01)
(Continued)

(52) U.S. Cl.
CPC ............. *H02K 5/04* (2013.01); *F16H 57/027* (2013.01); *H02K 5/20* (2013.01); *H02K 5/22* (2013.01);
(Continued)

(58) Field of Classification Search
CPC .. H02K 5/04; H02K 5/20; H02K 5/22; H02K 9/02; F16H 57/027
(Continued)

(56) References Cited

U.S. PATENT DOCUMENTS

| 2008/0041179 A1 | 2/2008 | Yasui et al. |
| 2008/0093133 A1 | 4/2008 | Yogo et al. |
| 2013/0307357 A1* | 11/2013 | Maksumic ............... H02K 5/20 310/54 |

FOREIGN PATENT DOCUMENTS

| CN | 102666172 | 9/2012 |
| JP | 10-325456 | 12/1998 |

(Continued)

Primary Examiner — Terrance L Kenerly
(74) Attorney, Agent, or Firm — Clark & Brody (57) ABSTRACT

An automotive motor drive unit includes a breather passage (Q) provided in casings (21a, 21r, 22a, 22r) that form an outer shape of the automotive motor drive unit; an entrance port (48m) that is provided at an inlet side of the breather passage and that connects with an internal space (L) defined by the casings; an exit port (67) that is provided at an outlet side of the breather passage and that connects with a space outside the casings; and obstacles (24, 25, 26) standing to form an inner wall of the breather passage and preventing lubrication oil in the internal space from proceeding straight ahead via the entrance port toward the exit port.

8 Claims, 5 Drawing Sheets (51) Int. Cl.
*H02K 5/20* (2006.01)
*H02K 5/22* (2006.01)
*H02K 9/02* (2006.01)

(52) U.S. Cl.
CPC ........... *H02K 9/02* (2013.01); *H02K 2205/09* (2013.01); *Y02T 10/641* (2013.01)

(58) Field of Classification Search
USPC .......................................... 310/52; 74/606 R
See application file for complete search history.

(56) References Cited

FOREIGN PATENT DOCUMENTS

| | | |
|---|---|---|
| JP | 2003-172458 | 6/2003 |
| JP | 2005-061456 | 3/2005 |
| JP | 2007-228682 | 9/2007 |
| JP | 2008-014406 | 1/2008 |
| JP | 2010-172069 | 8/2010 |
| JP | 2012-080661 | 4/2012 |
| JP | 2012-120292 | 6/2012 |
| WO | 2013/077214 | 5/2013 |

\* cited by examiner

FIG. 1

TO VEHICLE FRONT

BREATHER STRUCTURE OF IN-WHEEL MOTOR DRIVE UNIT AND IN-WHEEL MOTOR DRIVE UNIT INCLUDING THE SAME

TECHNICAL FIELD

The present invention relates to automotive motor drive units for driving wheels, and particularly to a breather structure in an automotive motor drive unit to prevent internal pressure in the automotive motor drive unit from being excessive.

BACKGROUND ART

Japanese Unexamined Patent Application Publication No. 2010-172069 (Patent Literature 1) discloses an in-wheel motor drive unit disposed in a road wheel internal space for a wheel, for example. The in-wheel motor drive unit of Patent Literature 1 includes a lubrication oil circuit of a center-shaft lubrication type. While the in-wheel motor drive unit is in operation, lubrication oil is discharged into the interior of the unit to lubricate a rotary shaft and gears inside the unit. As a result, the interior of the unit is sprayed with the lubrication oil, and an atmosphere of oil prevails inside the unit. Alternatively, an in-vehicle motor drive unit provided with another lubrication oil circuit of a bath lubrication type, instead of the center-shaft lubrication type, is known. The bath lubrication type employs rotation of a toothed wheel, such as an external gear, to splash lubrication oil and create an atmosphere of oil inside the unit. In any of both types, lubrication creates an atmosphere of oil inside the automotive motor drive unit, and the interior of the unit is sprayed with lubrication oil during operation.

CITATION LIST

Patent Literature

Patent Literature 1: Japanese Unexamined Patent Application Publication No. 2010-172069

SUMMARY OF INVENTION

Technical Problem

During travelling of a vehicle provided with an automotive motor drive unit, such as an in-wheel motor drive unit and an on-board motor drive unit, the temperature inside the automotive motor drive unit increases and the internal pressure in the automotive motor drive unit rises. To address this problem, a breather hole for adjusting the internal pressure can be provided in the casing of the automotive motor drive unit. If a breather hole is provided in the casing of the unit, the breather hole is often sprayed with lubrication oil coming from the internal space of the casing inside the unit. Consequently, the lubrication oil can possibly leak to the outside of the casing through the breather hole, resulting in a malfunction.

Especially when a passenger car travels at high speed on an expressway, rotational elements in an automotive motor drive unit rotate at high speed. This intensifies the spraying of the lubrication oil, and increases the probability of the lubrication oil leaking to the outside of the casing through the breather hole.

The present invention provides a technique for preventing a spray of lubrication oil from leaking from the inside of an automotive motor drive unit provided with a breather structure to the outside through the breather structure.

Solution to Problem

In order to achieve the above object, a breather structure of an automotive motor drive unit according to the present invention includes: a breather passage provided in a casing that forms an outer shape of the automotive motor drive unit; an entrance port that is provided at an inlet side of the breather passage and that connects with an internal space defined by the casing; an exit port that is provided at an outlet side of the breather passage and that connects with a space outside the casing; and an obstacle standing to form an inner wall of the breather passage and preventing lubrication oil in the internal space from proceeding straight ahead via the entrance port toward the exit port.

According to the present invention, the obstacle is disposed in the breather passage. Thus, even if a spray of lubrication oil creates an atmosphere of oil in the internal space of the casing and the spray of the lubrication oil advances into the breather passage, the obstacle in the breather passage can reduce the momentum of the spray of the lubrication oil. This configuration prevents the spray of the lubrication oil from fully passing through the breather passage and reaching the exit port. The obstacle volume and shape are not particularly limited as long as the obstacle stands like a screen between the entrance port and the exit port. The obstacle may be a protrusion like a pin or a wall-shaped object, for example.

According to an aspect of the present invention, the breather passage includes a pair of a first side surface and a second side surface facing each other. The first and second side surfaces extend from the inlet side through the outlet side. The obstacle includes a first barrier standing on the first side surface and forming a gap to the second side surface and a second barrier standing on the second side surface at a position closer to the outlet side than the first barrier and forming a gap to the first side surface. According to the aspect of the present invention, a breather passage that avoids the first and second barriers and extends in a zigzag can be provided. This configuration more effectively prevents the spray of the oil from proceeding through the breather passage from the inlet side to the outlet side.

The zigzag form of the breather passage can be provided by at least each one of the first barrier and the second barrier. According to another aspect of the present invention, it is preferred that at least three of the first and second barriers be alternately disposed along the breather passage. The breather passage according to the aspect of the invention can include many bends and have a labyrinthine structure.

The cross-sectional shape of the breather passage is not limited. The breather passage has a pair of side surfaces, an undersurface, and a top surface, for example. The undersurface of the breather passage may be substantially level or inclined. According to another aspect of the present invention, it is preferred that the breather passage further include an undersurface connected to the first and second side surfaces in which the undersurface slopes down from the outlet side to the inlet side of the breather passage. The undersurface of the breather passage according to the aspect of the present invention descends from the outlet side to the inlet side. Thus, even if a spray of lubrication oil enters the breather passage and collides with the pair of side surfaces and the barriers, the force of gravity causes the spray of the oil to fall into the undersurface of the breather passage and flow into the inlet side along the undersurface. Even if lubrication oil enters the breather passage via the entrance port, this configuration enables the force of gravity to return the lubrication oil to the internal space of the casing.

The structure of the exit port that connects the outlet side of the breather passage with the space outside the casing is not particularly limited. Preferably, the cross-sectional area of the exit port is smaller than that of the breather passage to prevent foreign matters from passing through. According to another aspect of the present invention, it is preferred that the exit port be formed on the second side surface. According to the aspect of the invention, even if a spray of lubrication oil coming from the internal space passes through the entrance port and goes round the first barrier, the spray of the oil finds difficulty in further going round the second barrier. Thus, even if the spray of the oil overcomes the second barrier and advances, the spray of the oil is not allowed to enter the exit port.

The breather passage may be a separate component that is attached and fixed to the casing. Preferably, the breather passage is integrated with the casing. According to another aspect of the present invention, it is preferred that the casing include a first casing and a second casing being joined to each other, and the first side surface and the first barrier be integrated with the first casing while the second side surface and the second barrier be integrated with the second casing. A breather passage according to the aspect of the present invention can be readily made by only butting a mating surface of the second casing into a mating surface of the first casing and joining them together for production of an automotive motor drive unit.

The disposition of the breather passage is not particularly limited. According to another aspect of the present invention, it is preferred that the breather passage be disposed in a terminal box that leads a power cable into the automotive motor drive unit. The breather structure according to the aspect of the invention can satisfy space constraints on an in-wheel motor drive unit, i.e., an automotive motor drive unit that is disposed in the internal space of a wheel inside a wheel housing of a vehicle body to drive the wheel.

The breather structure according to the present invention can be applied to various automotive motor drive units. One example is an in-wheel motor drive unit disposed inside a wheel for driving a vehicle, which includes a breather structure of the automotive motor drive unit according to the present invention and an automotive motor drive unit having the breather structure. An in-wheel motor drive unit according to an aspect of the present invention includes a motor portion, a wheel hub bearing portion, a speed reduction portion for decelerating rotation at the motor portion and for outputting the decelerated rotation to the wheel hub bearing portion, and a breather structure according to the present invention. The breather structure is provided in at least one of a casing for the motor portion and a casing for the speed reduction portion. The in-wheel motor drive unit according to the aspect of the present invention can prevent lubrication oil inside the in-wheel motor drive unit from leaking to the outside space. Preferably, the speed reduction portion of the in-wheel motor drive unit has a high reduction gear ratio. Examples of the speed reduction portion include a cycloidal speed reducer.

Advantageous Effects of Invention

According to the present invention described above, the probability of lubrication oil beyond the breather passage and leaking to the outside even when rotational elements rotate at high speed inside the automotive motor drive unit and the momentum of a spray of the lubrication oil is increased.

DESCRIPTION OF EMBODIMENT

Figure 1:
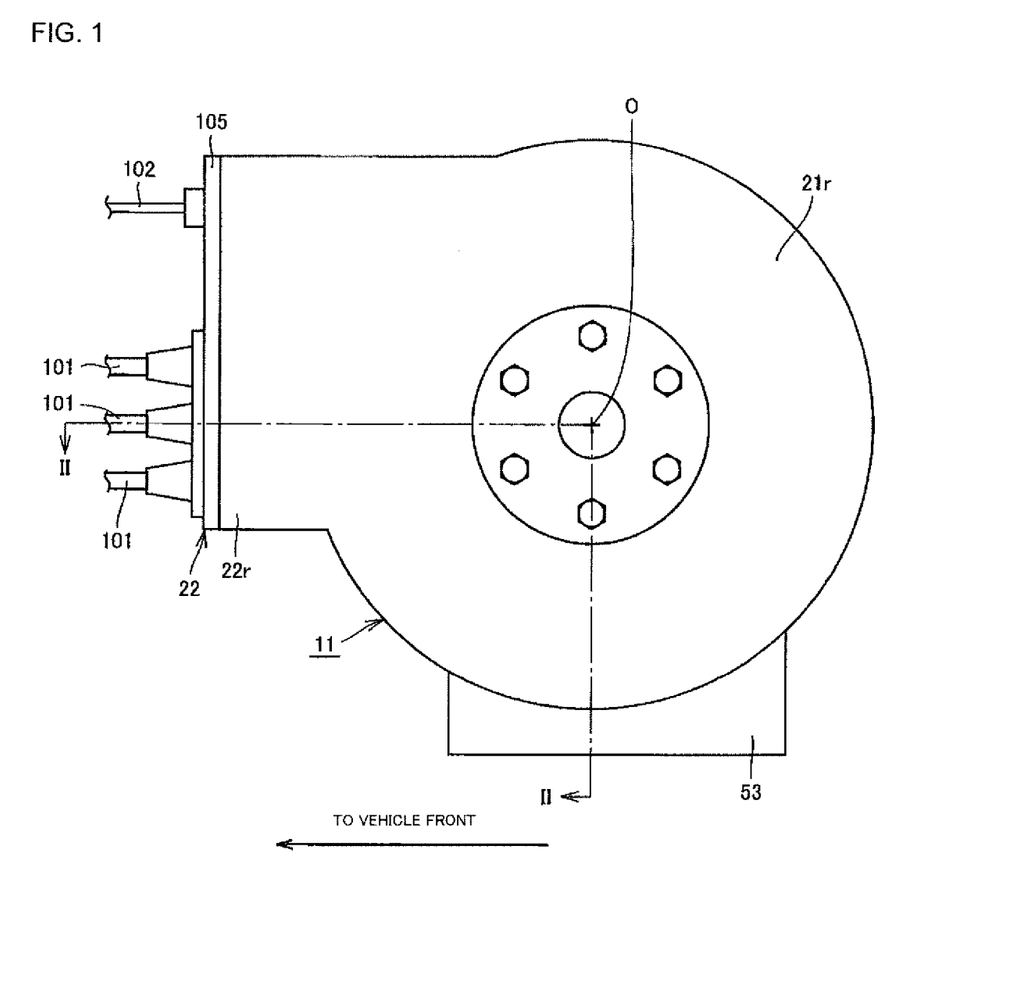
FIG. 1 is a back elevation illustrating an automotive motor drive unit according to an embodiment of the present invention.
Figure 2:
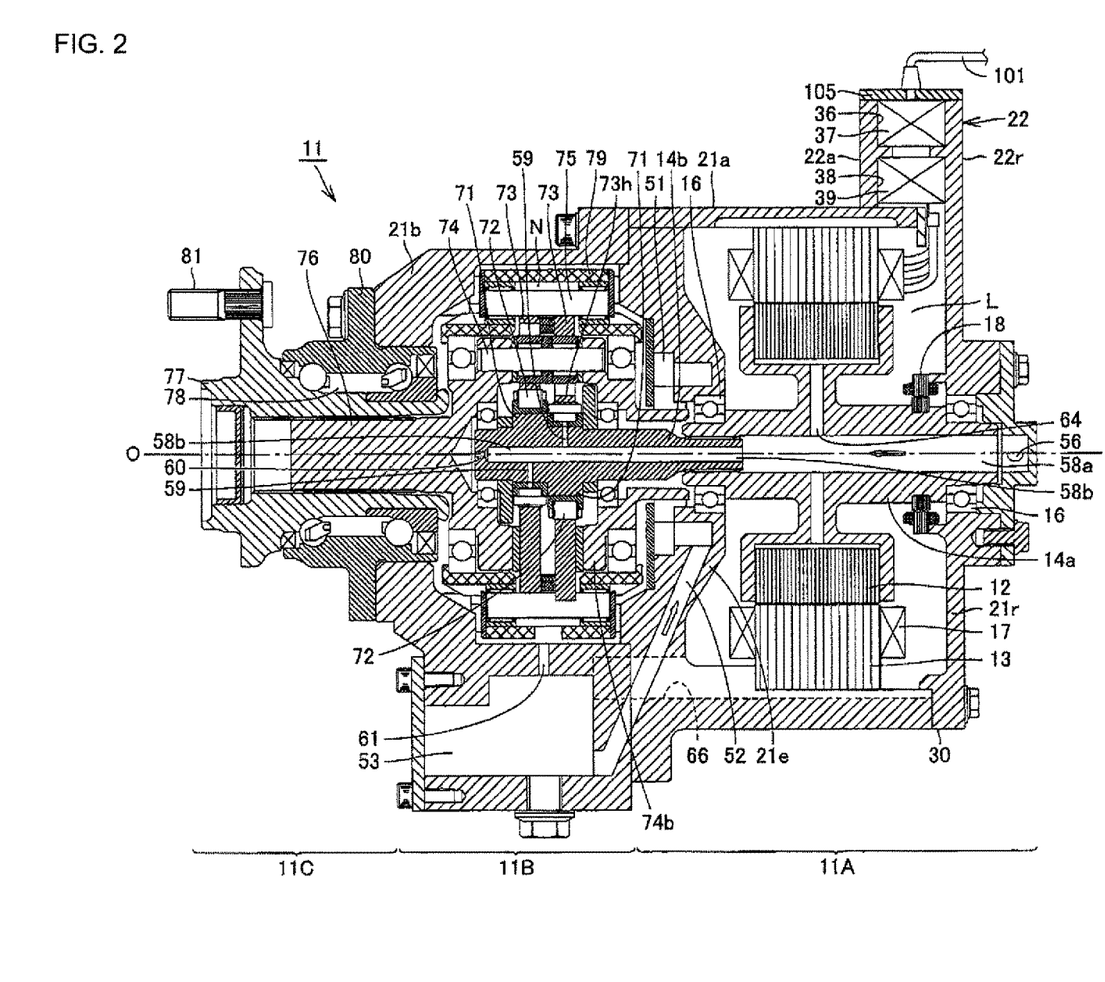
FIG. 2 is a longitudinal sectional view illustrating the embodiment, taken along line II-II in FIG. 1, as viewed in the direction of arrow.

Hereinafter, an embodiment of the present invention will be described in detail with reference to the drawings. FIG. 1 is a back elevation of an automotive motor drive unit according to the embodiment of the present invention, as viewed from the inner side (inboard side) in the lateral direction of an electric vehicle. FIG. 2 is a longitudinal sectional view of the embodiment taken along line II-II in FIG. 1, as viewed in the direction of arrow. An in-wheel motor drive unit 11, i.e., an automotive motor drive unit, is substantially cylindrical as shown in FIG. 1, and includes a motor portion 11A, a speed reduction portion 11B, and a wheel hub bearing portion 11C which are sequentially and coaxially arranged in series along the axis O of the in-wheel motor drive unit 11 as shown in FIG. 2.

With the axis O aligned along the vehicle width direction of the electric vehicle, the in-wheel motor drive unit 11 is mounted on a suspension device provided widthwise on the body of the electric vehicle so as to be in an orientation where the motor portion 11A disposed on the inner side (inboard side) in the vehicle width direction and the wheel hub bearing portion 11C disposed on the outer side (outboard side) in the vehicle width direction. This electric vehicle is capable of driving on public roads, such as ordinary roads and expressways.

The speed reduction portion 11B adjacent to the wheel hub bearing portion 11C is larger in diameter than the wheel hub bearing portion 11C. The motor portion 11A adjacent to the speed reduction portion 11B is larger in diameter than the speed reduction portion 11B. A casing 21a that forms an outer shape of the motor portion 11A is substantially cylindrical as viewed in the direction of the axis O of the in-wheel motor drive unit 11, and is a non-rotational stationary member centered around the axis O of the in-wheel motor drive unit 11. A casing 21b that forms an outer shape of the speed reduction portion 11B is similar to the casing 21a. In contrast, the wheel hub bearing portion 11C includes a rotary member (a hub ring 77) on its inner wheel side and a stationary member (an outer ring member 80) on its outer wheel side. The outer ring member 80 is fixed to the casing 21b with bolts. A wheel (not shown) is attached and fixed to the hub ring 77 which transmits the rotational driving force from the motor portion 11A to the wheel and conveys the vehicle weight to the wheel. With this configuration, the wheel hub bearing portion 11C and the speed reduction portion 11B are located in an internal space of the wheel, whereas the motor portion 11A juts out from the internal space of the wheel toward the inboard section. The casing 21a for the motor portion 11A includes a terminal box 22 that is formed so as to project radially outward (see FIG. 1).

As shown in FIG. 2, the motor portion 11A contains a rotor 12, a stator 13, and a motor shaft 14a, which constitute a rotating electrical machine, in a motor chamber L inside the casing 21a. The motor portion 11A generates electricity by transmitting the rotation to the wheel hub bearing portion 11C via the speed reduction portion 113 during the power running operation, or by using the rotation at the wheel hub bearing portion 11C during braking or similar operation. An axial end of the substantially cylindrical casing 21a is shielded with a disk-like motor rear cover 21r that forms the outer shape of the motor portion 11A. The stator 13 having a predetermined spacing is circumferentially attached and fixed to an inner peripheral surface of the casing 21a. The rotor 12 is disposed radially inward from the stator 13, and is attached and fixed to the motor shaft 14a extending along the axis O. A coil 17 for the stator 13 is electrically connected to three power lines 101 (see FIG. 1) via the terminal box 22. In the motor portion 11A, alternating current supplied to the coil 17 of the stator 13 generates an electromagnetic force, which rotates the rotor 12 made from a permanent magnet or a magnetic substance. Each power line 101 extends from an inverter (not shown) mounted on the vehicle body, and is covered with an insulating material. One end of the motor shaft 14a is supported by the motor rear cover 21r via one of roller bearings 16. The other end of the motor shaft 14a is supported by a partition 21e via the other of the roller bearings 16.

The substantially cylindrical casing 21b defines a space for a deceleration chamber N, and contains a speed reduction mechanism of the speed reduction portion 11B in the deceleration chamber N. This speed reduction mechanism is a cycloidal speed reducer, and includes an input shaft 14b, a pair of two eccentric members 71, two roller bearings 72, two circumferentially corrugated curve boards 73, plural inner pins 74, plural outer pins 75, and an output shaft 76. The input shaft 14b of the speed reduction portion 11B is coupled and fixed to the motor shaft 14a of the motor portion 11A. The input shaft 14b and the motor shaft 14a extend along the axis O and integrally rotate. Therefore, the input shaft 14b and the motor shaft 14a are also called motor-side rotary members. The eccentric members 71 each having a phase difference of 180° are eccentric with respect to the axis O, and are provided on the input shaft 14b. The two curve boards 73 each have a central hole. The inner periphery of the central hole is rotatably supported by the outer peripheral surface of each eccentric member 71 via the roller bearing 72. The respective outer pins 75 are fixed to an outer pin housing 79 that is elastically supported by the casing 21b, and are engaged with corrugated outer peripheral sections of the curve boards 73. This causes the curve boards 73 revolving around the axis O at high speed to slightly rotate on their respective axes. The inner pins 74 are attached and fixed to the output shaft 76, pass through a plurality of through holes 73h formed in the curve boards 73 at predetermined intervals in the circumferential direction, obtain only self-rotation of the curve boards 73, and transmit the rotation to the output shaft 76. This configuration allows the rotation of the input shaft 14b to be decelerated at the speed reduction portion 11B, and the decelerated rotation is output from the output shaft 76. The speed reduction portion 11B, i.e., a cycloidal speed reducer, offers a higher reduction gear ratio than speed reduction mechanisms composed of planetary or parallel-axes gears, and thus contributes to a reduction in size and weight of the in-wheel motor drive unit 11.

The hub ring 77 of the wheel hub bearing portion 11C is coupled and fixed to the output shaft 76. The rotatable hub ring 77 is rotatably supported by the outer ring member 80 via a roller bearing 78. A road wheel of the wheel (not shown) is attached and fixed to the hub ring 77 with bolts 81. The roller bearing 78 has a two-row structure, and, for example, is a multiple row angular contact ball bearing.

The working principle of the in-wheel motor drive unit 11 with the above-mentioned configuration will be briefly described. Electric power that is applied to the motor portion 11A and supplied to the coil 17 of the stator 13 causes the rotor 12 to rotate, and this rotation is output from the motor shaft 14a to the input shaft 14b of the speed reduction portion 11B. The speed reduction portion 11B decelerates the high speed rotation of the input shaft 14b, and outputs the low speed rotation from the output shaft 76 to the hub ring 77 of the wheel hub bearing portion 11C. Because the speed reduction portion 11B is a cycloidal speed reducer, the speed reduction portion 11B is smaller and lighter and has a higher reduction gear ratio than a speed reduction mechanism having parallel-axes gears or a speed reduction mechanism composed of planetary gears. Consequently, the reduction gear ratio obtained by dividing the rotation rate of the output shaft 76 by the rotation rate of the input shaft 14b falls within a range of 1/10 to 1/15.

A mechanism for lubricating the in-wheel motor drive unit 11 will be additionally described. The in-wheel motor drive unit 11 is provided with a lubrication oil circuit of a center-shaft lubrication type to lubricate and cool the motor portion 11A and the speed reduction portion 11B. Specifically, a lubrication oil reservoir 53 is provided at a lower part of the casing 21b. A lubrication oil pump 51 is disposed in the casing partition 21e that separates the motor chamber L for accommodating the motor portion 11A from the deceleration chamber N for accommodating the speed reduction portion 11B. The lubrication oil pump 51 is disposed coaxially of the axis O and is driven by an inner pin reinforcement 74b fastened to the inner pins 74. In other words, the lubrication oil pump 51 is driven by the rotation output from the speed reduction portion 11B. An intake oil passage 52 formed inside a wall of the partition 21e extends vertically. An upper end of the intake oil passage 52 is connected to an intake port of the lubrication oil pump 51, and a lower end thereof is connected to the lubrication oil reservoir 53 provided at a lower part of the speed reduction portion 11B. A discharge oil passage (not shown) formed both in the inner wall of the partition 21e and in an inner wall of the casing 21a extends from a discharge port of the lubrication oil pump 51 to the motor rear cover 21r.

Among the ends of the discharge oil passage (not shown), one end near the motor rear cover 21r is connected to a radially outer end of a connection oil passage 56 that is formed in a disk-like inner wall of the motor rear cover 21r to extend radially (only a radially inner end of the passage 56 is shown in FIG. 2). The radially inner end of the connection oil passage 56 is connected to a motor shaft oil passage 58a provided in the motor shaft 14a, as shown in FIG. 2.

The motor shaft oil passage 58a is provided inside the motor shaft 14a, and extends along the axis O. One end of the motor shaft oil passage 58a, which is near the speed reduction portion 11B, is connected to a speed-reduction-portion input-shaft oil passage 58b provided in the input shaft 14b and extending along the axis O. The other end of the motor shaft oil passage 58a near the motor rear cover 21r is connected to the connection oil passage 56 described above. In addition, the motor shaft oil passage 58a is connected to a radially inner end of a rotor oil passage 64 formed in a rotor flange at its center in the axial direction. Lubrication oil flowing through the rotor oil passage 64 cools the rotor 12, and is then sprayed from the rotor 12 into the motor chamber L to cool the stator 13 and to lubricate and cool the roller bearings 16 and the like.

The speed-reduction-portion input-shaft oil passage 58b is provided inside the input shaft 14b, and extends between both ends of the input shaft 14b along the axis O. A lubrication oil outlet 60 is provided at one end of the speed-reduction-portion input-shaft oil passage 58b, the one end facing the output shaft 76. Lubrication oil is sprayed from the lubrication oil outlet 60 into the deceleration chamber N.

The speed-reduction-portion input-shaft oil passage 58b is branched into a lubrication oil passage 59 extending inside the respective eccentric members 71 radially outward. The radially outer ends of the lubrication oil passage 59 are connected to the roller bearings 72 provided between the outer peripheral surfaces of the eccentric members 71 and the inner peripheral surfaces of the curve boards 73. Lubrication oil is sprayed from the lubrication oil passage 59 and the lubrication oil outlet 60 into the deceleration chamber N to lubricate and cool the roller bearings 72 in the deceleration chamber N, as well as contact areas of the inner pins 74, the outer pins 75, the curve boards 73, and other parts.

A speed-reduction-portion return hole 61 is provided at the bottom of the deceleration chamber N. The speed-reduction-portion return hole 61 passes through the casing 21b and makes the deceleration chamber N communicate with the lubrication oil reservoir 53. A motor-portion return hole 66 is provided at the bottom of the motor chamber L. The motor-portion return hole 66 passes through the partition 21e and makes the motor chamber L communicate with the lubrication oil reservoir 53.

The operation of the lubrication oil circuit will now be described. As shown by the recess arrow in FIG. 2, the lubrication oil pump 51 to be driven by the output shaft 76 via the inner pin reinforcement 74b takes up lubrication oil retained in the lubrication oil reservoir 53 through the intake oil passage 52 and discharges the lubrication oil to the discharge oil passage (not shown). The lubrication oil pressurized by the lubrication oil pump 51 passes through the discharge oil passage (not shown), the connection oil passage 56, and the motor shaft oil passage 58a in succession. The lubrication oil flowing through the motor shaft oil passage 58a is partially diverted into the rotor oil passage 64 and is sprayed from an outer peripheral surface of the rotor 12 into the motor chamber L. Subsequently, the lubrication oil goes to the bottom of the motor chamber L, flows thorough the motor-portion return hole 66, and returns to the lubrication oil reservoir 53. This configuration lubricates the motor portion 11A by action of center-shaft lubrication, and fills the motor chamber L with the sprayed lubrication oil to create an atmosphere of oil.

The lubrication oil flowing from the motor shaft oil passage 58a into the speed-reduction-portion input-shaft oil passage 58b diverges into the lubrication oil passage 59 and the lubrication oil outlet 60, and is sprayed into the deceleration chamber N. The sprayed oil sticks to the eccentric members 71, the roller bearings 72, the curve boards 73, the inner pins 74, and the outer pins 75 of the speed reduction portion 11B. Subsequently, the lubrication oil goes to the bottom of the deceleration chamber N, flows thorough the speed-reduction-portion return hole 61, and returns to the lubrication oil reservoir 53. This configuration lubricates the speed reduction portion 11B by action of center-shaft lubrication, and fills the deceleration chamber N with the sprayed lubrication oil to create an atmosphere of oil.

As shown in FIG. 1, the casing 21a for the motor portion 11A is provided with the terminal box 22 at its outer periphery. The terminal box 22 is formed at an upper part of the casing 21a to project toward the front of the vehicle, and includes a cover plate 105 for closing a front open end of the terminal box 22. The cover plate 105 has four through holes and leads three power lines 101 and one signal line 102 into the in-wheel motor drive unit 11 via the respective through holes.

The power lines 101 are cables of metal conductors sheathed with an insulating material. The conductors carry respective U-, V-, and W-phases of three-phase alternating current power. The signal line 102 is a cable integrating a plurality of wires that are individually sheathed for insulation, and is connected through the terminal box 22 to a plurality of sensors installed inside the in-wheel motor drive unit 11. The sensors may be a rotation rate sensor 18 or a temperature sensor (not shown), for example.

As shown in FIG. 2, the terminal box 22 is disposed near the motor rear cover 21r of the casing 21a to avoid interference with the wheel (not shown). A housing for the terminal box 22 is shaped like a cuboid box. A first casing 22a and a second casing 22r that can be separated along the axis O are joined to form the housing such that these casings are fitted each other.

Figure 3:
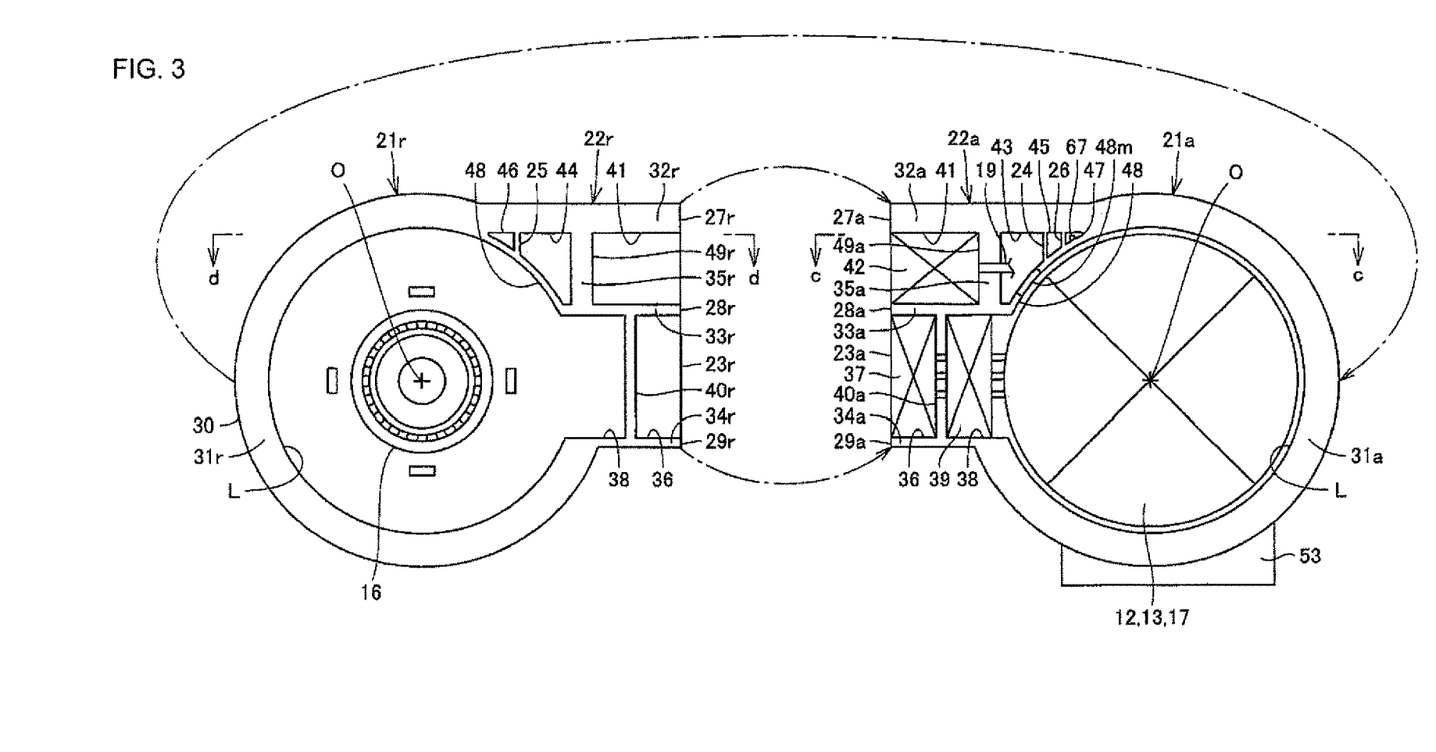
FIG. 3 is a schematic view illustrating a state where a motor rear cover is detached in the embodiment, in which the left side of the figure is a schematic view of a mating surface of the motor rear cover and the right side of the figure is a schematic view of a mating surface of a casing without the motor rear cover.
Figure 4:
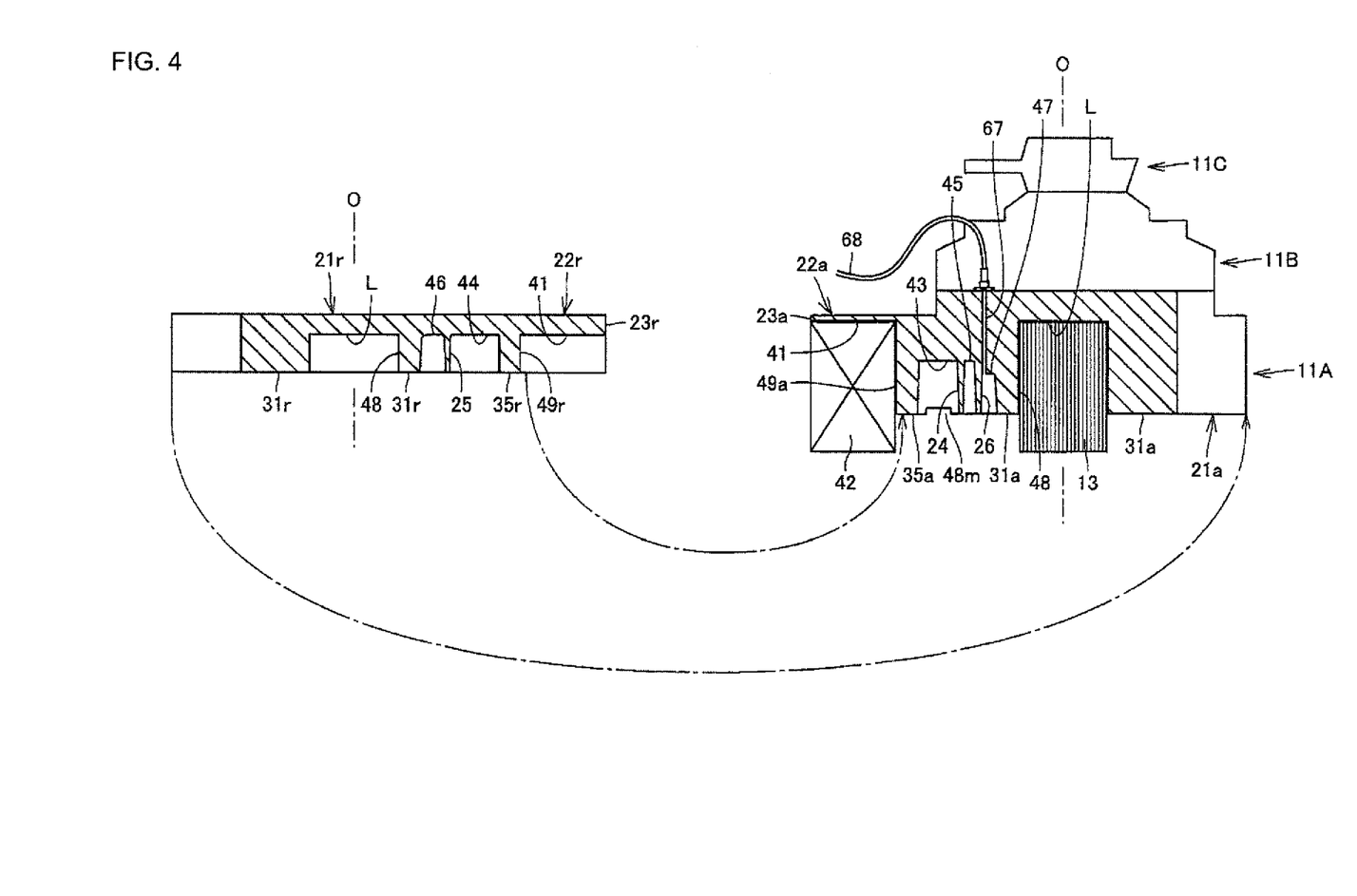
FIG. 4 is a transverse sectional view illustrating a state where the motor rear cover is detached in the embodiment, in which the left side of the figure shows a transverse section of an interior of the motor rear cover and the right side of the figure shows a schematic transverse section of an interior of the casing without the motor rear cover.
Figure 5:
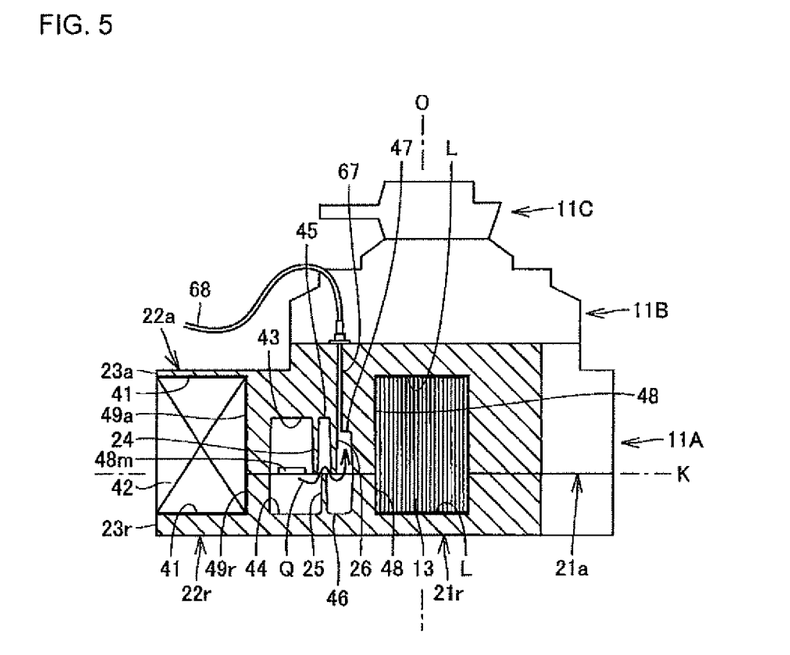
FIG. 5 is a cross-sectional view illustrating a breather passage of the embodiment, which corresponds to FIG. 4.

FIG. 3 is a schematic view illustrating a state where the power lines 101, the signal line 102, and the cover plate 105 are removed and the motor rear cover 21r is detached from the casing 21a in this embodiment. Specifically, the left side of FIG. 3 schematically illustrates a mating surface of the motor rear cover 21r. The right side of FIG. 3 schematically illustrates a mating surface of the casing 21a without the motor rear cover 21r. FIG. 4 is a transverse sectional view illustrating a state where the motor rear cover 21r is detached from the casing 21a in this embodiment. Specifically, the left side of FIG. 4 illustrates a transverse section of the motor rear cover 21r taken along line d-d of FIG. 3, as viewed in the direction of arrow. The right side of FIG. 4 illustrates a transverse section of the casing 21a and the neighboring first casing 22a without the motor rear cover 21r, taken along line c-c of FIG. 3, as viewed in the direction of arrow. FIG. 5 is a cross-sectional view of a breather passage according to this embodiment to illustrate a state where the first casing 22a and the second casing 22r are combined as shown in FIG. 4.

The in-wheel motor drive unit 11 according to this embodiment is provided in such a manner that the mating surface of the casing 21a and the mating surface of the motor rear cover 21r, which are shaped so as to correspond with each other as symmetrically shown in FIG. 3, are joined and fastened to come into contact with each other. In FIG. 3, the lubrication oil reservoir 53 is disposed at a lower part of the casing 21a; the first casing 22a of the terminal box 22 is disposed at the upper part of the casing 21a; and the second casing 22r of the terminal box 22 is disposed at an upper part of the motor rear cover 21r.

As shown in FIG. 1, the terminal box 22 is formed like a square tube extending in the front-back direction of the vehicle. The first casing 22a, i.e. a first half of the housing for the terminal box 22, is provided on the casing 21a and projects radially outward. Similarly to the casing 21a, the first casing 22a that is integrated with the casing 21a is made from aluminum or any other light alloy. The second casing 22r, i.e. a second half of the housing for the terminal box 22, is provided on the motor rear cover 21r and projects radially outward. The second casing 22r is integrated with the motor rear cover 21r and is made from aluminum or any other light alloy, similarly to the motor rear cover 21r. As shown in FIG. 1, the terminal box 22 is disposed at an upper part of the in-wheel motor drive unit 11 (more specifically the motor portion 11A) and projects toward the front of the vehicle.

As shown in FIG. 3, an open end of the cylindrical casing 21a is closed by the disk-like motor rear cover 21r. A mating surface 31a of the cylindrical casing 21a, which is joined to the motor rear cover 21r and serves as an end surface of the casing 21a, is a belt-shaped flat face extending like an arc. A protrusion 30 is formed at an outer edge of the disk-like motor rear cover 21r and projects toward the outboard. A mating surface 31r of the motor rear cover 21r, which is joined to the casing 21a and serves as an end of the protrusion 30, is a belt-shaped flat face extending like an arc. As indicated with the dot-and-dash arrow in FIG. 3, the mating surface 31a of the casing 21a and the mating surface 31r of the motor rear cover 21r come into contact with and join each other. The mating surfaces 31a and 31r come into close contact with each other via a liquid resin such as a liquid gasket or a sealing material.

In the following description, a forward and rearward direction is defined such that the first casing 22a is located forward of the casing 21a while the casing 21a is located rearward of the first casing 22a. Likewise, an upward and downward direction is defined such that the lubrication oil reservoir 53 is located downward of the casing 21 while the casing 21 is located upward of the lubrication oil reservoir 53. The first casing 22a protruding forward from the casing 21a includes a first quadrilateral side wall 23a perpendicular to the axis O, and an upper wall 27a, a middle wall 28a, and a lower wall 29a that are integrated with the first side wall 23a and standing inboard. The upper wall 27a, the middle wall 28a, and the lower wall 29a each extend in the forward and rearward direction and are disposed in this order at intervals in the upward and downward direction. The first casing 22a further includes partition walls 40a and 49a each extending in the upward and downward direction between the respective three walls.

The second casing 22r includes a second quadrilateral side wall 23r perpendicular to the axis O, and an upper wall 27r, a middle wall 28r, and a lower wall 29r that are integrated with the second side wall 23r and standing outboard. The upper wall 27r, the middle wall 28r, and the lower wall 29r each extend in the forward and rearward direction and are disposed in this order at intervals in the upward and downward direction. The second casing 22r further includes partition walls 40r and 49r each extending in the upward and downward direction between the respective three walls.

At an edge of the upper wall 27a of the first casing 22a, an upper mating surface 32a is formed. A middle mating surface 33a is formed at an edge of the middle wall 28a. A lower mating surface 34a is formed at an edge of the lower wall 29a. The mating surfaces 31a, 32a, 33a, and 34a constitute a flat surface perpendicular to the axis O (the right side of FIG. 3).

At an edge of the upper wall 27r of the second casing 22r, an upper mating surface 32r is formed. A middle mating surface 33r is formed at an edge of the middle wall 28r. A lower mating surface 34r is formed at an edge of the lower wall 29r. The mating surfaces 31r, 32r, 33r, and 34r constitute a flat surface perpendicular to the axis O (the left side of FIG. 3).

When the mating surface 31r of the motor rear cover 21r is brought into contact with and aligned with the mating surface 31a of the casing 21a, the respective mating surfaces of the second casing 22r are brought into contact with and aligned with the respective mating surfaces of the first casing 22a. Specifically, the mating surface 32r of the second casing 22r is aligned with the mating surface 32a of the first casing 22a. The mating surface 33r is aligned with the mating surface 33a. The mating surface 34r is aligned with the mating surface 34a.

Substantially quadrilateral recesses 36 and 38 are defined between the middle and lower mating surfaces 33a and 34a of the three belt-shaped mating surfaces 32a, 33a, and 34a. Similar recesses 36 and 38 are defined between the middle and lower mating surfaces 33r and 34r. The first and second casings 22a and 22r align each other such that the lower recesses 36 and 36 define an independent space that accommodates a connector 37. As a result of the first and second casings 22a and 22r aligning each other, the lower recesses 38 and 38 as well define an independent space that accommodates a connector 39.

One end of the connector 37 is connected to the three wire power lines 101 and the other end of the connector 37 is connected to the connector 39. The connector 39 is connected to the coil 17. The connectors 37 and 39 of the terminal box 22 are connected via a conductor passing through the partition wall 40a that divides the recess 36 from the recess 38. The partition walls 40a and 40r join each other and constitute a common partition wall.

As shown at the right side of FIG. 3, substantially quadrilateral recesses 41, 43, 45, and 47 are defined between the upper mating surface 32a and the middle mating surfaces 33a. As shown at the left side of FIG. 3, a similar recess 41 and different shaped recesses 44 and 46 are defined between the upper mating surface 32r and the middle mating surfaces 33r. As a result of the first and second casings 22a and 22r aligning each other, the upper recesses 41 and 41 as well define an independent space that accommodates a connector 42 for connecting the signal line 102 and sensors (e.g., the rotation rate sensor 18). In contrast, the upper recesses 44 and 46 overlap the upper recess 43, 45, and 47 in a zigzag such that these recesses constitute a breather passage Q (see FIG. 5) acting as a serially connected space. The breather passage Q will be described in detail later.

The recesses 43, 45, and 47 of the first casing 22a are divided from the motor chamber L of the casing 21a by a partition wall 48 extending along an arc centered on the axis O. The partition wall 48 on the casing 21a side partially merges into the mating surface 31a, and an edge of the partition wall 48 is flush with the mating surface 31a (the right side of FIG. 3). Similarly, the recesses 44 and 46 of the second casing 22r are divided from the motor chamber L of the motor rear cover 21r by a partition wall 48 extending along an arc centered on the axis O. The partition wall 48 on the motor rear cover 21r side partially merges into the mating surface 31r, and an edge of the partition wall 48 is flush with the mating surface 31r (the left side of FIG. 3).

The partition wall 48 on the casing 21a side includes a communicating port 48m for connecting the recess 43 with the motor chamber L. The communicating port 48m forms a cut on the edge of the partition wall 48 and extends circumferentially. Alternatively, the communicating port 48m may be a hole passing through the partition wall 48.

The partition wall 48 forms undersurfaces of the recesses 43, 45, and 47. As shown in the right side of the FIG. 3, the undersurfaces of the recesses 43, 45, and 47 constitute an inclined curved surface of an arc. As shown at the right side of FIG. 3, the undersurfaces of the recesses 47, 45, and 43 are shallower in this order. As shown at the left side of FIG. 3, undersurfaces of the recesses 46 and 44 are shallower in this order. The second casing 22r is closely aligned with the first casing 22a such that these partition walls 48 join each other. The partition walls 48 are provided with the communicating port 48m that forms a long hole extending in the upward and downward direction. The recesses 43 to 47 are disposed along the outer periphery of the cylindrical casing 21a. The dimensions of the recesses 43 to 47 in the upward and downward direction decrease with an increase in distance from the communicating port 48m. In other words, the recesses 43 and 44 that are the closest to the communicating port 48m have the largest dimensions, and the recess 47 that is the farthest from the communicating port 48m has the smallest dimension in the direction.

As shown in FIGS. 3 and 4, the recesses 41, 43, 45, and 47 formed at the upper section of the first casing 22a are disposed side by side in this order from forward to rearward. The recess 41 is divided from the recess 43 by a partition wall 49a. The partition wall 49a stands inboard from the first side wall 23a and extends in the upward and downward direction so as to connect with the upper and middle walls 27a and 28a. At an edge of the partition wall 49a, a mating surface 35a is formed. The mating surface 35a is connected to and flush with the mating surfaces 32a and 33a. One end of the connector 42 of the terminal box 22 is connected to the signal line 102. The other end of the connector 42 is connected to sensors (e.g., the rotation rate sensor 18) inside the motor portion 11A and the speed reduction portion 11B via a conductor 19 that extends so as to pass through the partition wall 49a adjacent to the connector 42.

The recesses 43 and 45 formed at the upper section of the first casing 22a are divided each other by a first barrier 24. The recess 45 is divided from the recess 47 by a first barrier 26. The first barriers 24 and 26 as well stand inboard from the first side wall 23a and extend in the upward and downward direction so as to connect with the upper and middle walls 27a and 28a. Edges of the first barriers 24 and 26 are flush with the mating surfaces 31a and 32a. The recess 47 is provided with a breather hole 67. The breather hole 67 passes through the first side wall 23a and extends along the axis O so as to connect with the outside of the in-wheel motor drive unit 11, i.e., a space outside the first casing 22a and the casing 21a.

As shown at the right side of FIG. 3, the breather hole 67 is circular in cross section. A cross-sectional diameter of the hole is smaller than the dimension of the recess 47 in the upward and downward direction. As shown in FIG. 4, the breather hole 67 is connected with one end of a breather hose 68 coming from the outside. The breather hose 68 is a flexible tube such as a rubber hose. The other end of the breather hose 68 is brought into the inside of the vehicle or any space where no water nor mud exists.

The recesses 41, 44, and 46 formed at the upper section of the second casing 22r are disposed side by side in this order from forward to rearward. The recess 41 is divided from the recess 44 by a partition wall 49r. The partition wall 49e stands outboard from the second side wall 23r and extends in the upward and downward directions so as to connect with the upper and middle walls 27r and 28r. At an edge of the partition wall 49r, a mating surface 35r is formed. The mating surface 35r is connected to and flush with the mating surfaces 32r and 33r. The recess 44 is divided from the recess 46 by a second barrier 25. The second barrier 25 as well stands outboard from the second side wall 23r and extends in the upward and downward direction so as to connect with the upper and middle walls 27r and 28r. An edge of the second barrier 25 is flush with the mating surfaces 31r and 32r.

The second casing 22r is aligned with the first casing 22a, so that the second side wall 23r faces the first side wall 23a and both side walls constitute a pair of side walls that is parallel to each other. Accordingly, the mating surface 35r of the second casing 22r is joined to the mating surface 35a of the first casing 22a, and as described above, the other mating surfaces 32r, 33r, and 34r of the second casing 22r are joined to the mating surfaces 32a, 33a, and 34a of the first casing 22a respectively. In contrast, the second barrier 25 and the first barriers 24 and 26 are disposed in a staggered format. In other words, as a result of alignment of the second casing 22r with the first casing 22a, the second barrier 25 is placed between the first barriers 24 and 26 as shown in FIG. 5 rather than being joined to the first barriers 24 and 26. Consequently, the recesses 43, 44, 45, 46, and 47 are serially connected in this order and constitute the breather passage Q shown in FIG. 5.

In FIG. 5, a mating surface formed in linear shape by joining of the first and second casings 22a and 22r represents a mating plane K. The breather passage Q extends along the mating plane K in a zigzag. The mating plane K connects an inlet area of the breather passage Q to an outlet area of the breather passage Q. The inlet area of the breather passage Q is a space defined by the recesses 43 and 44 and is connected with the motor chamber L via the communicating port 48m. The outlet area of the breather passage Q is a space defined by the recesses 46 and 47 and is connected with the outside of the in-wheel motor drive unit 11 via the breather hole 67. The long-hole communicating port 48m is provided at the inlet side of the breather passage Q and forms an entrance port for connection with the motor chamber L. The circular breather hole 67 is provided at the outlet side of the breather passage Q and forms an exit port for connection with the outside of the in-wheel motor drive unit 11.

If an increase in the temperature in the in-wheel motor drive unit 11 causes internal pressure in the motor chamber L to rise during operation of the in-wheel motor drive unit 11, the internal pressure will pass through the communicating port 48m and the breather passage Q to the breather hole 67. This reduces the compression in the motor chamber L. If a decrease in the temperature in the in-wheel motor drive unit 11 after a halt in operation of the in-wheel motor drive unit 11 causes the internal pressure in the motor chamber L to fall, the air will go through the breather hole 67 and flow into the motor chamber L via the breather passage Q and the communicating port 48m. This returns the pressure in the motor chamber L to atmospheric pressure.

As shown in FIGS. 3 and 5, the in-wheel motor drive unit 11 according to this embodiment includes: the breather passage Q provided in the casing 21a that forms an outer shape of the in-wheel motor drive unit 11; the communicating port 48m that is provided at the inlet side of the breather passage Q and connects with an internal space defined by the casing 21a; the breather hole 67 that is provided at the outlet side of the breather passage Q and connects with an space outside the casing 21a; and the first barriers 24 and 26 that stand to form an inner wall of the breather passage Q and prevent lubrication oil in the internal space from proceeding straight ahead via the communicating port 48m toward the breather hole 67. This configuration provides a zigzag structure of the breather passage Q, and even if a spray of lubrication oil occupying the motor chamber L enters the inlet area (the recess 43) of the breather passage Q via the communicating port 48m at high speed, the zigzag structure hinders the spray of the oil from passing through the breather passage Q and reaching the outlet area (the recess 47) of the breather passage Q. As a result, this embodiment does not allow lubrication oil to leak from the breather hole 67 during operation of the in-wheel motor drive unit 11.

The breather passage Q according to this embodiment includes a pair of face-to-face side surfaces of the first and second side walls 23a and 23r, which extends from the inlet area through the outlet area. The first barrier 24 that stands on the first side wall 23a and forms a gap to the second side wall 23r is provided as an obstacle that prevents lubrication oil from proceeding straight ahead from the recess 43 in the inlet area to the recess 45 in the outlet area. The second barrier 25 that stands on the second side wall 23r at a position closer to the outlet area than the first barrier 24 and forms a gap to the first side wall 23a is provided as an obstacle that prevents lubrication oil from proceeding straight ahead from the recess 43 in the inlet area to the recess 45 in the outlet area. This configuration can achieve a zigzag structure of the breather passage Q. As a result, even if a spray of lubrication oil enters the inlet area (the recesses 43 and 44) of the breather passage Q from the motor chamber L, the first and second barriers 24 and 25 hinder the spray of the oil from advancing further into the recess 45.

In this embodiment, more than three barriers of the first barrier 24, the second barrier 25, and the first barrier 26 are alternately disposed along the breather passage Q in a staggered format. Consequently, even if a spray of lubrication oil overcomes the first and second barriers 24 and 25 and enters the recess 45, the first barrier 26 obstructs the spray of the oil and the chances of the spray of the oil advancing into the recess 46 are extremely low.

In other words, the breather passage Q forms a labyrinthine structure having a maze-like path such that the level of difficulty with which a spray of oil advances into rises with an increase in travel distance from the communicating port 48m near the inlet area of the breather passage Q to the recesses 43, 44, 45, 46, and 47. This configuration makes it difficult for a spray of oil to reach the outlet area of the breather passage Q.

In this embodiment, the breather hole 67, which passes through the first side wall 23a of the first casing 22a to connect with the outside of the in-wheel motor drive unit 11, is provided at the outlet side (the recess 47) of the breather passage Q. Even if a spray of oil overcomes the first barrier 26 situated farthest to the outlet area through the recess 45 and enters the outlet area, the spray of the oil is not allowed to go round the first barrier 26 and reach the first side wall 23a of the recess 47. This prevents the spray of the oil from entering the breather hole 67.

The housing for the terminal box 22 according to this embodiment is made by joining the first and second casings 22a and 22r to each other. The first side wall 23a and the first barriers 24 and 26 are integrated with the first casing 22a. The second side wall 23r and the second barrier 25 are integrated with the second casing 22r. As a result, the zigzag breather passage Q can be readily made by only joining the first and second casings 22a and 22r.

The in-wheel motor drive unit 11 is desired to be compact especially because it is installed inside wheels. The breather passage Q according to this embodiment is disposed along the outer periphery of the casing 21a and thus takes up less room. This configuration is advantageous in terms of space constraints on in-wheel motor drive units.

The embodiment according to the present invention has been described above with reference to the attached drawings. The scope of the present invention, however, should not be limited to the embodiment described above. Various modifications and alterations can be made to the illustrated embodiment without departing from the identical or equivalent scope of the present invention.

INDUSTRIAL APPLICABILITY

An automotive motor drive unit according to the present invention can be advantageously used for an electric vehicle and a hybrid vehicle.

REFERENCE SIGNS LIST

11: in-wheel motor drive unit
13: stator
16: bearing
17: coil
18: rotation rate sensor
19: conductor
21a, 21b: casing
21r: motor rear cover
22: terminal box
22a: first casing
22r: second casing
23a: first side wall
23r: second side wall
24, 26: first barrier
25: second barrier
27a, 27r: upper wall
28a, 28r: middle wall
29a, 29r: lower wall
30: protrusion
31a, 31r: mating surface
32a, 32r, 33a, 33r, 34a, 34r, 35a, 35r: mating surface
36, 38, 41, 43, 44, 45, 46, 47: recess
37, 39, 42: connector
40a, 40r, 48: partition wall
48m: communicating port
49a, 49r: partition wall
67: breather hole
68: breather hose
101: power line
102: signal line
105: cover plate
K: mating plane
L: motor chamber
N: deceleration chamber
O: axis
Q: breather passage

The invention claimed is:

1. A breather structure of an in-wheel motor drive unit, comprising:
a breather passage provided in a casing that forms an outer shape of the in-wheel motor drive unit;

an entrance port provided at an inlet side of the breather passage, the entrance port connecting with an internal space defined by the casing;

an exit port provided at an outlet side of the breather passage, the exit port connecting with a space outside the casing, an outer side part of the exit port located in an internal space of a wheel for the in-wheel motor drive unit; and an obstacle standing to form an inner wall of the breather passage and comprising a plurality of barriers, wherein the plurality of barriers are arranged between the entrance and exit ports, each barrier increasing in size from the exit port to the entrance port, the obstacle preventing lubrication oil in the internal space from proceeding straight ahead via the entrance port toward the exit port.

2. The breather structure of an in-wheel motor drive unit according to claim 1, wherein the breather passage includes a pair of a first side surface and a second side surface facing each other, the first and second side surfaces extending from the inlet side through the outlet side, and the plurality of barriers include:
- a first barrier standing on the first side surface, the first barrier forming a gap between the first barrier and the second side surface; and
- a second barrier standing on the second side surface at a position closer to the outlet side than the first barrier, the second barrier forming a gap between the second barrier and the first side surface.

3. The breather structure of an in-wheel drive unit according to claim 2, wherein at least three of the first and second barriers are alternately disposed along the breather passage.

4. The breather structure of an in-wheel motor drive unit according to claim 2, wherein the breather passage further includes an undersurface connected to the first side surface and the second side surface, the undersurface sloping down from the outlet side to the inlet side of the breather passage.

5. The breather structure of an in-wheel motor drive unit according to claim 2, wherein the exit port is formed on the second side surface.

6. The breather structure of an in-wheel motor drive unit according to claim 2, wherein
- the casing includes a first casing and a second casing being joined to each other,
- the first side surface and the first barrier are integrated with the first casing, and
- the second side surface and the second barrier are integrated with the second casing.

7. The breather structure of an in-wheel motor drive unit according to claim 1, wherein the breather passage is disposed in a terminal box that leads a power cable into the automotive motor drive unit.

8. An in-wheel motor drive unit comprising:
- a motor portion;
- a wheel hub bearing portion;
- a speed reduction portion configured to decelerate rotation at the motor portion and output the rotation to the wheel hub bearing portion; and
- the breather structure of the in-wheel motor drive unit according to claim 1, the breather structure being provided in at least one of a casing for the motor portion and a casing for the speed reduction portion.

* * * * *